Feb. 7, 1967 W. G. WALKER 3,302,321
FOLDABLE STRUCTURE
Filed Aug. 16, 1963
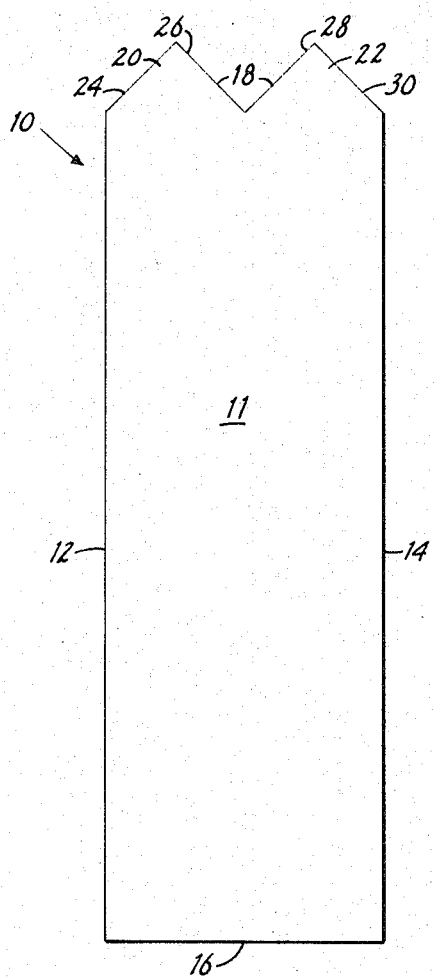
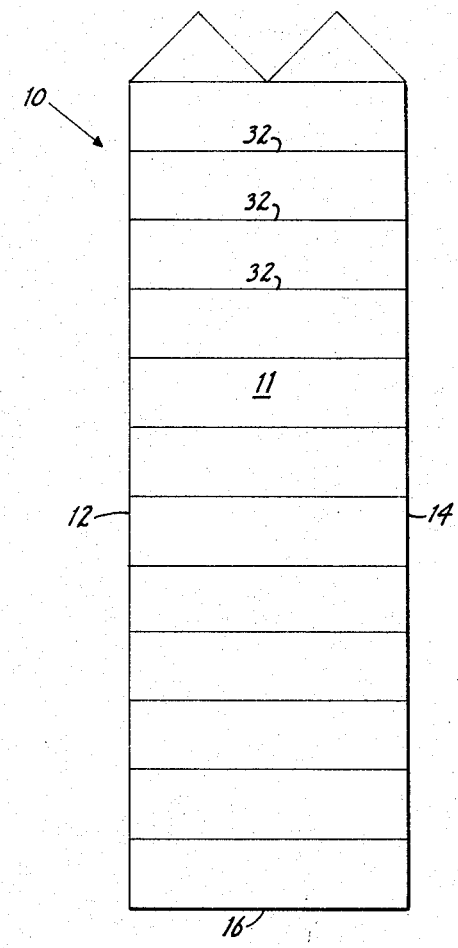
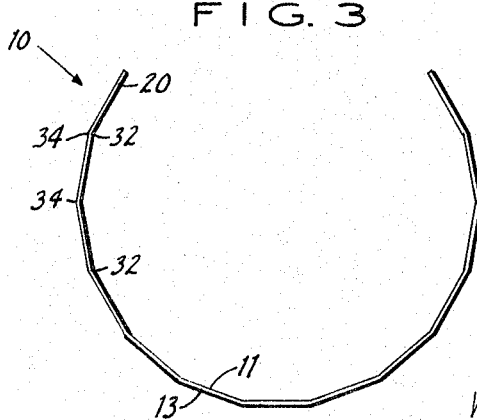
INVENTOR.
WALLACE G. WALKER
BY
Ward, Neal, Haselton, Orme & McElhannon
ATTORNEYS Feb. 7, 1967 W. G. WALKER 3,302,321
FOLDABLE STRUCTURE
Filed Aug. 16, 1963 6 Sheets-Sheet 2
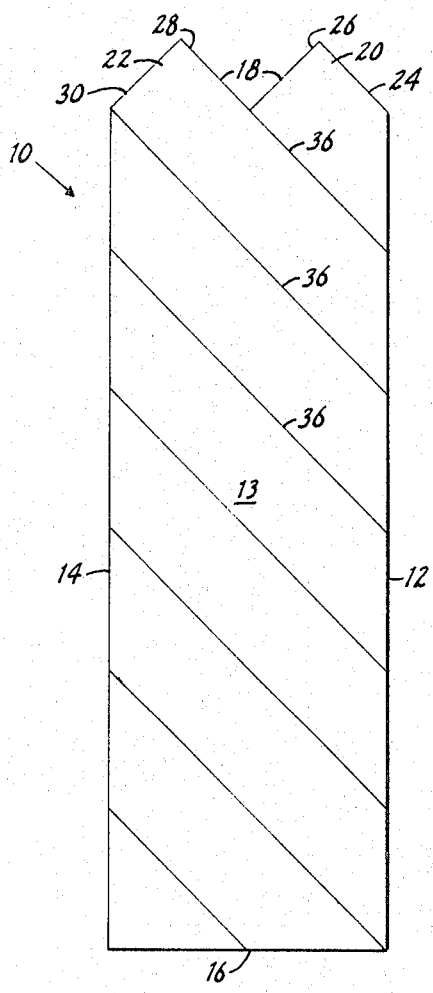
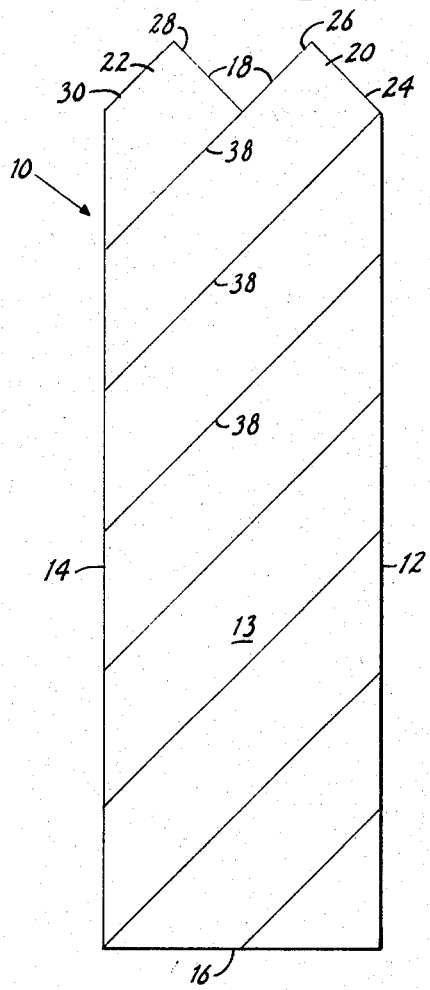
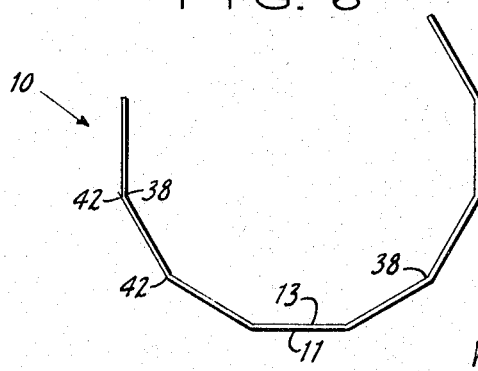
INVENTOR.
WALLACE G. WALKER
BY
Ward, Neal, Haselton, Orme & McElhannon
ATTORNEYS Feb. 7, 1967 W. G. WALKER 3,302,321
FOLDABLE STRUCTURE
Filed Aug. 16, 1963 6 Sheets-Sheet 3
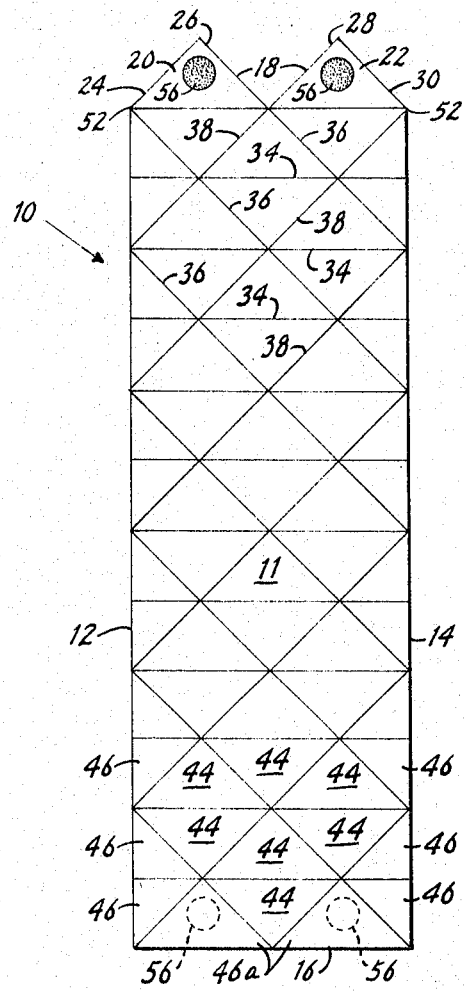
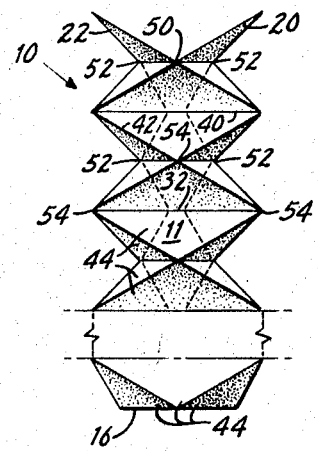
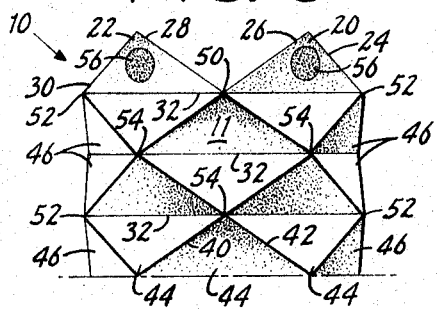
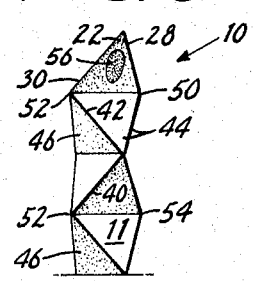
INVENTOR.
WALLACE G. WALKER
BY
Ward, Neal, Haselton, Orme & McElhannon
ATTORNEYS Feb. 7, 1967 W. G. WALKER 3,302,321
FOLDABLE STRUCTURE
Filed Aug. 16, 1963 6 Sheets-Sheet 4
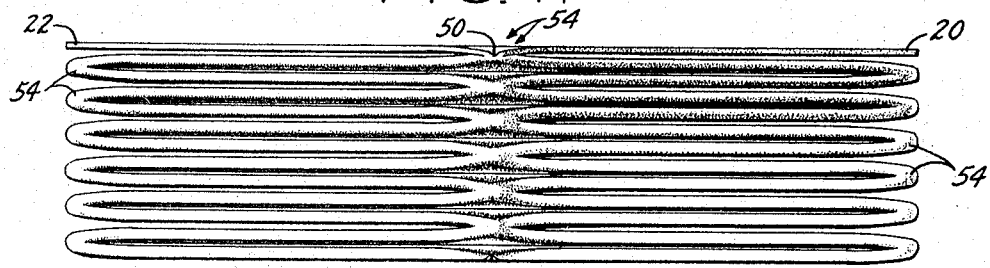
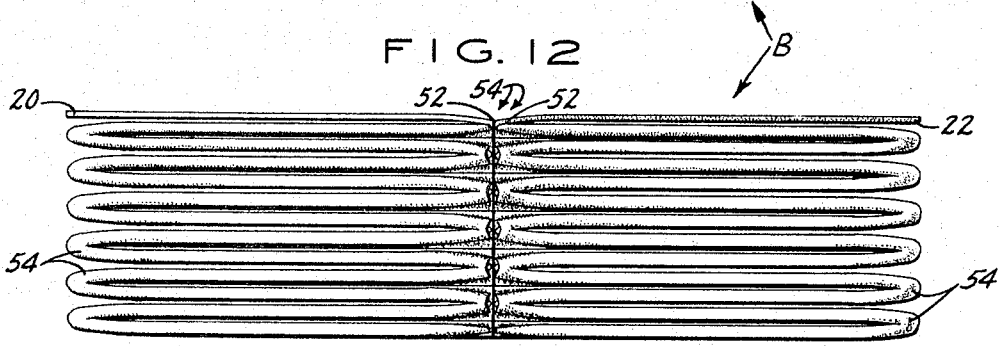
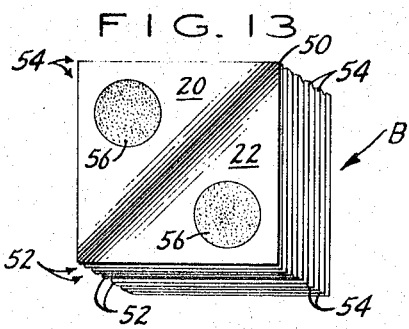
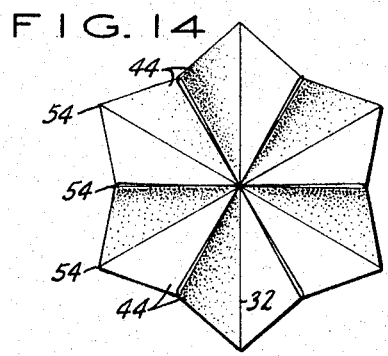
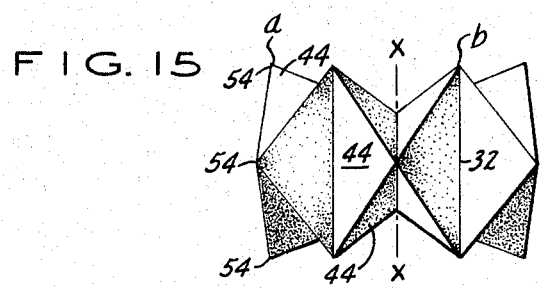
INVENTOR.
WALLACE G. WALKER
BY
Ward, Neal, Haselton, Orme & McElhannon
ATTORNEYS Feb. 7, 1967 W. G. WALKER 3,302,321
FOLDABLE STRUCTURE
Filed Aug. 16, 1963 6 Sheets-Sheet 5

INVENTOR.
WALLACE G. WALKER
BY
Ward, Neal, Haselton, Orme & McElhannon
ATTORNEYS Feb. 7, 1967  W. G. WALKER  3,302,321
FOLDABLE STRUCTURE
Filed Aug. 16, 1963  6 Sheets-Sheet 6

INVENTOR.
WALLACE G. WALKER
BY
Ward, Neal, Haselton, Orme & McElhanno
ATTORNEYS

United States Patent Office 3,302,321
Patented Feb. 7, 1967

3,302,321
FOLDABLE STRUCTURE
Wallace G. Walker, 41 W. 49th St.,
New York, N.Y. 10046
Filed Aug. 16, 1963, Ser. No. 302,525
2 Claims. (Cl. 46—1)

The present invention relates broadly to a foldable structure and, more particularly, to a paper device foldable from a blank to form a structure manipulatable to present a plurality of changeable panels to a viewer.

In the present invention there is provided a creased blank of paper cardboard, or similar foldable material, which is preferably creased diagonally on one side and laterally on the opposite side thereof to form a plurality of hinged triangular sections. The terminal ends of the blank are then joined to form a three-dimensional annular article having a plurality of hinged interconnected pyramidal-like protuberances. The article is manipulatable by rotation about its central axis to present all of the triangular sections of the blank to view in a continuously changing pattern. Thus, the structure of the present invention is suitable as an amusement device in the nature of a kaleidoscope or a geometrical educational device. It can also be utilized for advertising and display purposes.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention and wherein like numerals designate like parts:

FIG. 1 is a plan view of the blank used with the present invention prior to scoring;

FIG. 2 is a plan view of the blank of FIG. 1, provided with the first set of lateral score lines;

FIG. 3 is a side view of the blank of FIG. 2, folded along the lateral score lines;

FIGS. 4 and 5 are views of the blank of FIG. 1, provided with the diagonal score lines;

FIG. 6 is a side view of the blank folded along the score lines shown in FIGS. 4 and 5;

FIG. 7 is a plan view of the blank of the present invention provided with the first, second and third sets of score lines;

FIG. 8 is a partial view of the blank of FIG. 7, folded along the three sets of score lines;

FIG. 9 is a side view of the portion of the blank shown in FIG. 8;

FIG. 10 is a plan view partly schematic of the folding of the blank of FIG. 7 and the inward collapse thereof into overlying relationship;

FIG. 11 is a front view of the blank in collapsed relationship;

FIG. 12 is a back view of the blank in collapsed relationship;

FIG. 13 is a perspective top view of the blank in collapsed relationship;

FIG. 14 is a plan view of the structure formed by the blank folded and adhered in accordance with the present invention;

FIG. 15 is a front view of the structure shown in FIG. 14;

Figure 16:
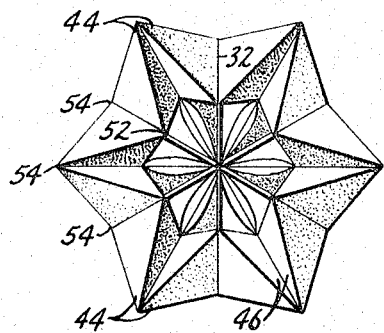
FIGS. 16, 18, 20, 22, 24 and 26 are successive views of the structures formed by rotation of the structure of FIG. 14 about its central axis, with FIG. 26 corresponding to FIG. 14 to complete the cyclic pattern.
Figure 20:
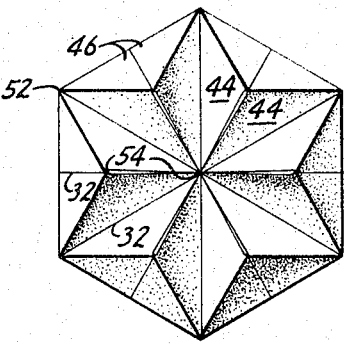
Figure 17:
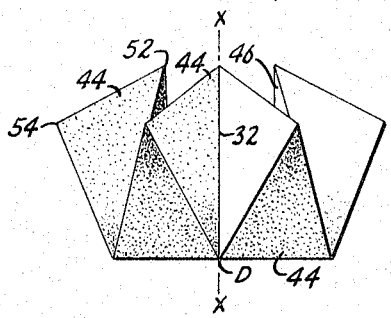
FIGS. 17, 19, 21, 23, 25 and 27 are front views of the structures of FIGS. 18, 20, 22, 24 and 26, respectively.
Figure 21:
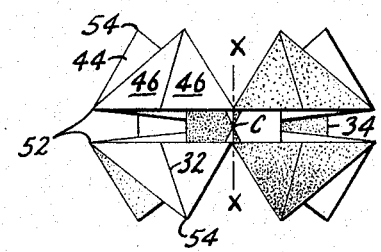
Figure 18:
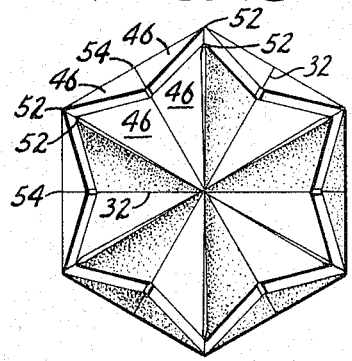
Figure 19:
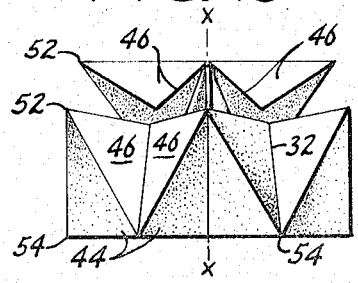
Figure 22:
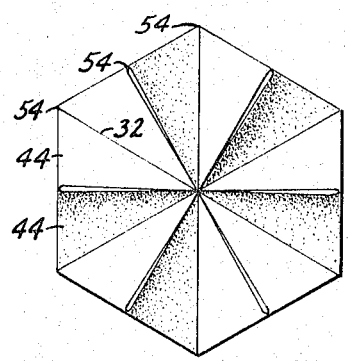

Referring to the drawings, the blank 10 utilized in the present invention is preferably of sturdy paper or cardboard. However, other foldable scoreable materials, such as plastic, can be employed also. The material for blank 10 is required, however, to be sufficiently sturdy to successfully withstand numerous foldings. Blank 10 includes a pair of elongated side edges 12 and 14, a bottom edge 16 and a top edge 18 provided with an adhering flap having two triangular sections 20 and 22 formed by inclined sides 24 and 26, and 28 and 30, respectively.

Blank 10 is scored on its face 11 along parallel, equally-spaced lateral score lines 32 to form parallel fold lines 34 on face 13 of blank 10. In like manner, face 13 is scored along parallel, equally-spaced diagonal score lines 36. Face 13 is also provided with a second set of equally-spaced diagonal score lines 38 transverse to score lines 36. Score lines 36 and 38 form intersecting transverse fold lines 40 and 42, respectively, on face 11 of blank 10.

Blank 10, scored and reversely folded as described hereinabove, is shown in FIG. 7, and includes a plurality of isosceles triangular sections 44 hingedly interconnected along fold lines 34, 40 and 42. In addition, there is formed in blank 10 a plurality of edge isosceles triangular sections 46, also hingedly interconnected to each other and to sections 44 by score lines 34, 40 and 42.

In the embodiment shown, sections 44 are formed in three contiguous rows with the sections in each row hingedly connected along a fold line 32. In the interior row, the sections 44 are connected to their adjacent sections 44 in the outer rows along diagonal fold lines 36 and 38. The sections 44 in the outermost rows are hingedly connected to edge sections 46 by fold lines 36 and 38 alternately, while contiguous sections 46 are hingedly interconnected to each other along fold line 32.

Fold lines 34 form twelve lateral tiers of triangles in blank 10 comprised of three inner isosceles triangles 46 and two edge triangles 46.

FIGS. 8 and 9 illustrate blank 10 after folding along lines 32, 36 and 38. At this stage, blank 10 includes a plurality of side apex points 52 and intermediate apex points 54. Central apex points 50 join contiguous triangular sections 44 and 46. As shown in FIGS. 10–12, the opposed side edges 12 and 14 of blank 10 are moved toward each other into adjacent relationship while the entire blank is compressed in accordion-like fashion to dispose the triangular sections 44 and 46 in superposed disposition. Blank 10, when fully compressed, assumes a rectangular form designated generally B with central apexes 50, the edge apexes 52 and the intermediate apexes 54 all aligned in adjacent relationship to form the corners of the rectangle.

To form the three-dimensional article of the present invention, rectangle B is axially expanded and the top edge triangular sections 20 and 22 are brought around and adhered to the triangular sections 46a at bottom edge 16. To adhere sections 20 and 22 to their associated sections 46a, blank 10 has glue spots 56 suitably provided thereon. It will be noted that the adhesive is applied to sections 20 and 22 on face 11, while it is applied to sections 46a on face 13. It will be thus understood that when these sections are adhered face 11 is in contact with face 13. However, other suitable means, such as taping, for adhering faces 11 and 13 can be employed without adverse effect.

When sections 20 and 22 are thus joined to sections 46a, blank 10 assumes the shape shown in FIG. 14, namely, as viewed in plan as twelve-sided, star-like structure formed of a plurality of interconnected pyramid-like shapes, totally formed of triangular sections 44 and 46.

Figure 26:
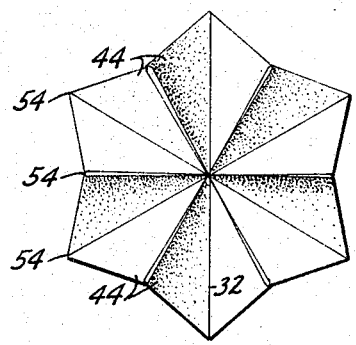
Figure 23:
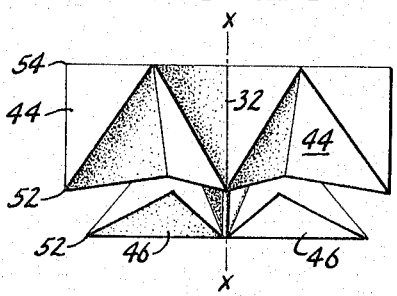
Figure 27:
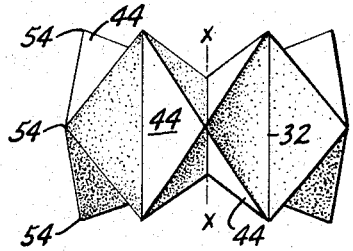
Figure 24:
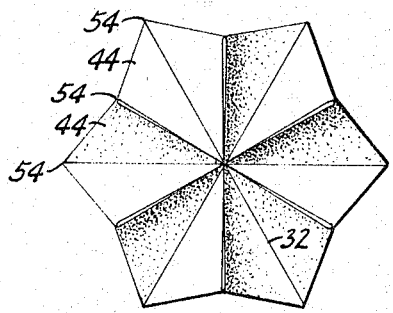
Figure 25:
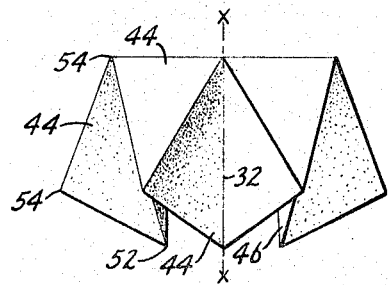

To change the pattern presented to the viewer, the points, such as *a* and *b*, of the pyramidal shapes are rotated outwardly and downwardly about central axis X—X. This, of course, urges points, such as C and D, inwardly and upwardly relative to axis X—X. The successive shapes thus presented to view by such continued rotation about axis X—X are shown in FIGS. 16, 18, 20, 22, 24 and 26. It will be noted that FIG. 26 and FIG. 14 are identical, the shapes being repetitive in series as the rotation is continued. The hinged joints 50 and 54 operate as swivel joints permitting rotation of the pyramidal sections continuously about the central axis X—X to present to view a changing cyclic pattern of shapes and forms.

Panels 44 and 46 can be provided with suitable illustrations or advertising material to produce an amusing display device or toy. Further, the panels can be suitably colored in varied patterns to present to the viewer a fascinating, continously-changing cyclic pattern of colors and hues.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. A generally rectangular, elongated blank for forming a generally hexagonal, changeable structure from foldable, scoreable material, having a pair of elongated side edges, a bottom edge and a top edge having a securing tab thereon, a plurality of equally spaced first score lines on one face of said blank to form first integral hinge means therein generally parallel to said bottom edge, a second set of equally spaced score lines angularly related to said first set for forming first diagonal integral hinge means in said blank, and a third set of equally spaced score lines substantially transverse to said second set for forming second diagonal integral hinge means, a pair of successive ones of said first integral hinge means defining therebetween three inner isosceles triangles and a pair of outer triangles, each of said inner isosceles triangles being formed by a pair of transversely related diagonal integral hinge means and said successive first integral hinge means, said outer triangles being formed by said diagonal integral hinge means, one of said first integral hinge means and one of said elongated side edges, and means for joining the bottom edge of said blank to the top securing tabs of said blank, thereby forming an endless chain of integrally hinged triangles.

2. The blank of claim 1, wherein there is provided eleven first score lines, and seven each of said second and third score lines to form three inner isosceles triangles and two outer triangles between successive first integral hinge means, thereby forming a total of sixty triangles in said blank.

References Cited by the Examiner
UNITED STATES PATENTS

| | | | |
|---|---|---|---|
| 1,997,022 | 4/1935 | Stalker | 46—1 |
| 2,007,421 | 7/1935 | Coughlin | 46—1 |
| 2,922,239 | 1/1960 | Glynn | 161—14 |

OTHER REFERENCES

Gardner M.: Flexagons, in Scientific American, vol. 195, No. 6, pages 162, 164 and 166, December 1956.

RICHARD C. PINKHAM, *Primary Examiner.*

LOUIS J. BOVASSO, *Examiner.*